United States Patent
Chao

(10) Patent No.: US 7,535,512 B2
(45) Date of Patent: May 19, 2009

(54) IMAGE PROCESSING METHOD AND RELATED APPARATUS

(75) Inventor: Po-Wei Chao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 735 days.

(21) Appl. No.: 11/164,030

(22) Filed: Nov. 8, 2005

(65) Prior Publication Data

US 2006/0109377 A1    May 25, 2006

(30) Foreign Application Priority Data

Nov. 22, 2004    (TW) .............................. 93135882 A

(51) Int. Cl.
*H04N 7/01*    (2006.01)

(52) U.S. Cl. ...................................... 348/448; 348/441

(58) Field of Classification Search ................. 348/448, 348/441, 451, 452, 458, 459, 607, 624, 625, 348/630; *H04N 7/01, 11/20, 5/21*
See application file for complete search history.

(56) References Cited

U.S. PATENT DOCUMENTS

| 6,262,773 B1 * | 7/2001 | Westerman ................. 348/448 |
| 6,731,342 B2 * | 5/2004 | Shin et al. ................... 348/452 |

* cited by examiner

*Primary Examiner*—Sherrie Hsia
(74) *Attorney, Agent, or Firm*—Winston Hsu

(57) ABSTRACT

An image processing method includes deinterlacing a video data to generate first, second, and third pixels; recording a plurality of interpolation rules corresponding to the first, second, and third pixels; and determining whether to adjust the pixel value of the second pixel according to at least one of the plurality of interpolation rules; wherein the interpolation rule of each pixel recording the pixel is generated by an intra-field interpolation or an inter-field interpolation.

23 Claims, 2 Drawing Sheets

IMAGE PROCESSING METHOD AND RELATED APPARATUS

BACKGROUND OF THE INVENTION

1. Field of the Invention

The present invention relates to image processing techniques, and more particularly, to methods and apparatus for improving image quality in accordance with the information obtained from a de-interlacing operation.

2. Description of the Prior Art

In conventional interlaced scanning, an odd field (which is composed of odd scan lines) and an even field (which is composed of even scan lines) of a frame are successively scanned.

Recently, progressive scan techniques, which are also referred to as non-interlaced scan, combine the two fields into one frame and then scan the frame with double horizontal scan frequency in sequence to improve the image quality.

To display video data with the progressive scan means, a de-interlacing operation is typically employed to interpolate a new scan line between two successive scan lines within a field. It can be appreciated that a substantial need exists for methods and apparatus for improving the image quality of the de-interlaced images.

SUMMARY OF THE INVENTION

It is therefore an objective of the claimed invention to provide image processing methods and related apparatus for adjusting the interpolated pixel values according to the information obtained in the de-interlacing operation.

According to an exemplary embodiment of the present invention, an image processing method is disclosed comprising: de-interlacing video data to generate pixel values for first, second, and third pixels; recording a plurality of interpolation rules corresponding to the first, second, and third pixels; and determining whether to adjust the pixel value of the second pixel according to at least one of the plurality of interpolation rules; wherein the interpolation rule of each pixel indicates whether the pixel was generated through an intra-field interpolation operation or an inter-field interpolation operation.

According to an exemplary embodiment of the present invention, an image processing device for de-interlacing video data, comprising a plurality of adjacent fields, to generate a pixel value for a second pixel is disclosed. The image processing device comprises: a detection module for determining a degree of difference among the plurality of fields with respect to the pixel position of the second pixel; a decision unit coupled to the detection module for generating an interpolation rule according to the degree of difference; an interpolating circuit coupled to the decision unit for generating the pixel value of the second pixel according to the interpolation rule and the video data; and a post processing circuit coupled to the decision unit and the interpolating circuit for determining whether to adjust the pixel value of the second pixel according to at least one of a plurality of interpolation rules corresponding to the second pixel, a first, and a third pixel; wherein the interpolation rule of each pixel indicates whether the pixel was generated through an intra-field interpolation operation or an inter-field interpolation operation.

According to an exemplary embodiment of the present invention, an image processing method for processing pixels produced by a de-interlacing operation is disclosed comprising: recording a plurality of interpolation rules corresponding to first, second, and third pixels produced by the de-interlacing operation; and adjusting a pixel value of the second pixel according to at least one of the plurality of interpolation rules; wherein the interpolation rule of each pixel indicates whether the pixel was generated through an intra-field interpolation operation or an inter-field interpolation operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
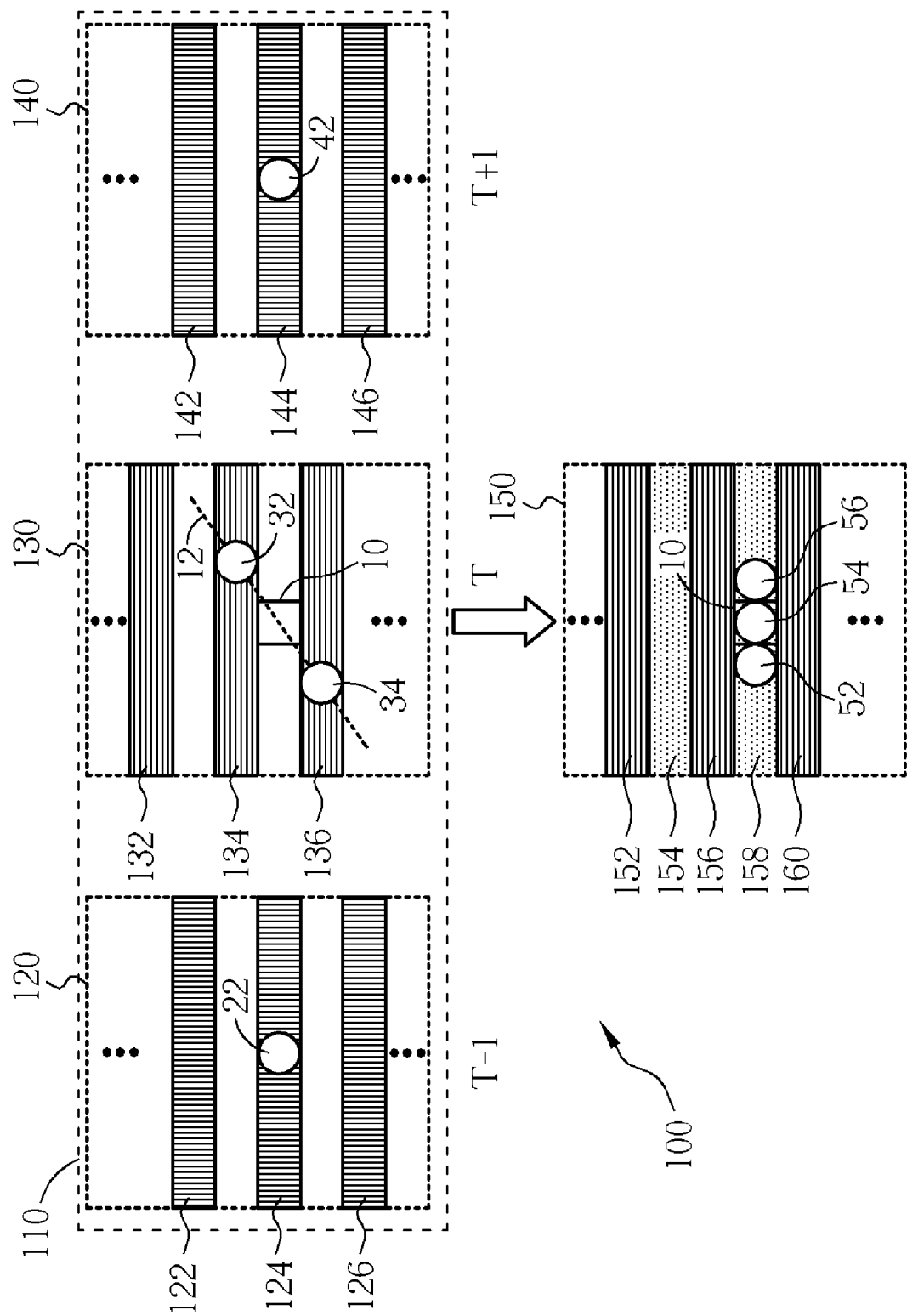
FIG. 1 is a schematic diagram showing three consecutive fields of video data and a corresponding output frame according to the present invention.

FIG. 1 is a diagram depicting three consecutive fields of video data 110 and a corresponding de-interlaced output frame 150 according to one embodiment of the present invention. The output frame 150 corresponds to time T while the three consecutive fields 120, 130 and 140 correspond to times T−1, T and T+1, respectively. In FIG. 1, scan lines 122, 132 and 142 are respectively the $(N-1)^{th}$ scan lines of fields 120, 130 and 140; scan lines 124, 134 and 144 are respectively the $N^{th}$ scan lines of fields 120, 130 and 140; and scan lines 126, 136 and 146 are respectively the $(N+1)^{th}$ scan lines of fields 120, 130 and 140. Each scan line comprises a plurality of pixels. In practice, the pixel value referred to hereinafter may be considered either the luminance or chrominance of the pixel.

Generally, pixel values of the scan lines 132, 134, and 136 of the field 130 could be utilized as pixel values at those same pixel locations of the scan lines 152, 156, and 160 of the output frame 150; however, this configuration is not a restriction of the present invention. Pixel values of the scan lines 154 and 158 of the output frame 150 are generated by de-interlacing the video data 110. Note that the de-interlacing methods and apparatuses to be disclosed are feasible for various motion adaptive de-interlacing applications or motion compensation de-interlacing applications.

Figure 2:
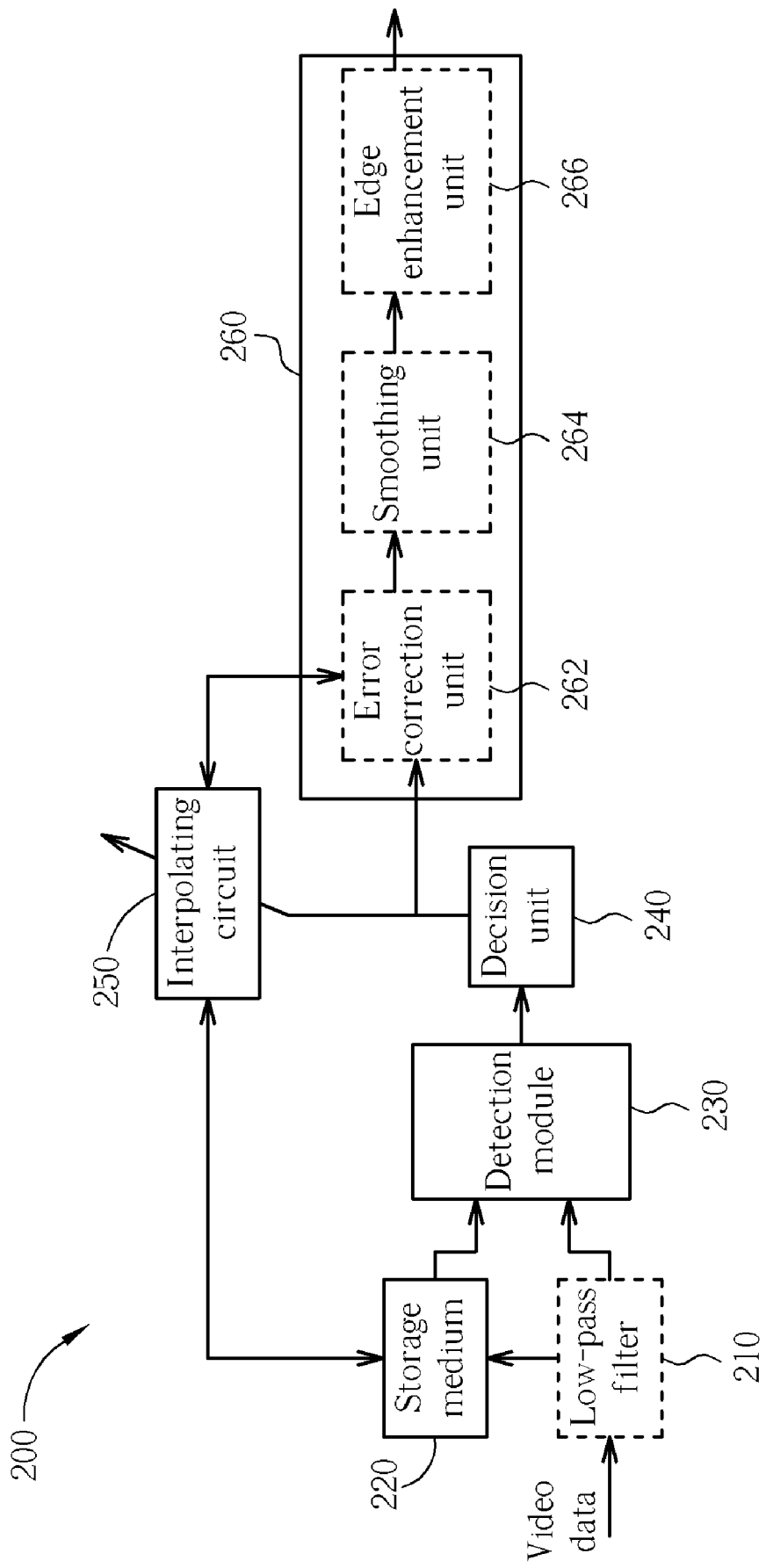
FIG. 2 is a block diagram of a de-interlacing device according to one embodiment of the present invention.

Please refer to FIG. 2, which shows a block diagram of a de-interlacing device 200 according to one embodiment of the present invention. The de-interlacing device 200 is utilized for generating pixel values of the scan lines 154 and 158. The operations of how the de-interlacing device 200 generates a pixel value for a target position 10 within the output frame 150 are described in detail below. As shown in FIG. 2, the de-interlacing device 200 comprises a low-pass filter (LPF) 210, a storage medium 220, a detection module 230, a decision unit 240, an interpolating circuit 250, and a post processing circuit 260. The low-pass filter 210 is arranged for low-pass filtering to smooth images of the video data 110. In practice, the de-interlacing device 200 may directly processes the video data 110 without the low-pass filtering process. The storage medium 220 is utilized for temporarily storing required pixel data during the de-interlacing operation. The storage medium 220 is generally implemented with a buffer or a memory.

In one embodiment, the detection module 230 determines a degree of difference between two successive fields (e.g., the first being between the field 130 and the field 120 or the second being between the field 130 and the field 140 or both) with respect to the target position 10. The degree of difference can be represented in a variety of ways that are known in the art. One representation for the degree of difference is the sum of absolute differences (SAD) among plural pixels that are located at corresponding positions of two fields. In another embodiment, the detection module 230 further determines a degree of difference between two corresponding fields within two successive frames (e.g., between the field 140 and the field 120) with respect to the target position 10. In practice, the detection module 230 may be implemented with an inter-field difference detector or a combination of an inter-field difference detector and an inter-frame difference detector. The operations and implementations of the detection module 230 are well known in the art and further details are therefore omitted here.

Next, the decision unit 240 determines if the image corresponding to the target position 10 is a still image or a stationary image according to the detection result obtained by the detection module 230. This information about the image is necessary for selecting an interpolation rule or strategy to be utilized in the interpolating circuit 250. In practice, the decision unit 240 may issue a control value to control the operations of the interpolating circuit 250. For example, if the image corresponding to the target position 10 is determined to be a still image then the decision unit 240 can accordingly transmit a control value "0" to the interpolating circuit 250. This action causes the interpolating circuit 250 to perform an inter-field interpolation operation. This operation will generate a pixel value for the target position 10 of the output frame 150 (i.e., to generate a pixel 54) according to the pixel values of pixels of the field 120 or field 140 or both, with respect to the target position 10, such as a pixel 22 or a pixel 42 or both. On the other hand, if the image corresponding to the target position 10 is determined to be in motion then the decision unit 240 can transmit another control value "1" to the interpolating circuit 250. This causes the interpolating circuit 250 to perform an intra-field interpolation operation to generate a pixel value for the pixel 54 of the output frame 150 according to the pixel values of existing pixels of the field 130. In practice, both the inter-field interpolation operation and the intra-field interpolation operation have various implementations.

In other words, the decision unit 240 instructs the interpolating circuit 250 to perform either an inter-field interpolation operation or an intra-field interpolation to generate the pixel value of the pixel 54 according to the detection result of the detection module 230. When the interpolating circuit 250 performs the intra-field interpolation operation under the control of the decision unit 240, an edge detection operation is executed to determine an edge direction for utilization in the intra-field interpolation operation. The edge detection operation executed by the interpolating circuit 250 is well known in the art so further details are omitted for brevity. Suppose that an edge direction 12 as shown in FIG. 1 is selected through the edge detection operation. Next, the interpolating circuit 250 performs the intra-field interpolation operation to generate the pixel value of the target pixel 54 utilizing pixels corresponding to the edge direction 12 such as a pixel 32 or a pixel 34 or both.

The post processing circuit 260 is then utilized to adjust the pixel value of the pixel 54 according to the interpolation rules of a plurality of pixels including the pixel 54. In practical implementations, the post processing circuit 260 may utilizes a resister or buffer (not shown) to record the interpolation rules of the pixel 54 and pixels 52 and 56. Additionally, the practical implementation of the post processing circuit 260 determines whether to adjust the pixel value of the pixel 54 according to those interpolation rules. Of course, the interpolation rules of the pixels 52, 54, and 56 may instead be recorded in the storage medium 220. In this embodiment, the interpolation rule of each pixel comprises the interpolation type of the pixel. The interpolation type indicates whether the pixel was generated through an intra-field interpolation operation or an inter-field interpolation operation. If the pixel was generated through the intra-field interpolation operation, the interpolation rule further comprises an edge direction corresponding to the interpolated pixel.

The interpolation types of the pixels 52, 54 and 56 are decided by the control values generated from the decision unit 240. The post processing circuit 260 can obtain the interpolation types of the pixels 52, 54 and 56 simply by recording their corresponding control values. As mentioned above, if one of the pixels 52, 54, 56 is generated through the intra-field interpolation operation, the post processing circuit 260 further records the corresponding edge direction employed by the interpolating circuit 250.

In a preferred embodiment, the post processing circuit 260 comprises an error correction unit 262, a smoothing unit 264, and an edge enhancement unit 266 as shown in FIG. 2. The operations of these components of the post processing circuit 260 are described below.

[Error Correction Operation]

The error correction unit 262 is arranged for determining the validity of the interpolation rule of the pixel 54 according to a plurality of interpolation rules corresponding to the pixels 52, 54, and 56. It is not necessary to adjust the pixel value of the pixel 54 when the error correction unit 262 determines that the interpolation rule of the pixel 54 is valid. On the other hand, if the interpolation rule of the pixel 54 is determined to be invalid then the error correction unit 262 will adjust the pixel value of the pixel 54. In this embodiment, the error correction unit 262 determines if the interpolation rule of the pixel 54 is valid by checking the control value sequence corresponding to the pixels 52, 54, and 56 satisfies a predetermined rule. If so, the error correction unit 262 determines that the interpolation rule of the pixel 54 is valid; otherwise, the interpolation rule of the pixel 54 is determined to be invalid. As described in the foregoing descriptions, when the control value of a pixel is "0", it means that the pixel is generated through an inter-field interpolation operation. When the control value of a pixel is "1", it means that the pixel is generated through an intra-field interpolation operation. In this embodiment, the error correction unit 262 determines that the interpolation rule of the pixel 54 is valid when the control value sequence of pixels 52, 54, and 56 is "000", "001", "100" or "101."

When the control value sequence is "011" or "110", the error correction unit 262 further determines if the edge direction corresponding to the pixel 54 is the vertical direction. If so, interpolation rule of the pixel 54 is determined to be valid, otherwise the error correction unit 262 further checks if an included angle, defined by two edge directions respectively corresponding to two pixels that are generated through the intra-field interpolation operations, is less than a first threshold value. For example, when the control value sequence is "011", the error correction unit 262 checks if an included angle defined by an edge direction corresponding to the pixel 54 and an edge direction corresponding to the pixel 56 is less than the first threshold value. If so, the error correction unit 262 determines that the interpolation rule of the pixel 54 is valid; otherwise, it determines that the interpolation rule of the pixel 54 is invalid.

When the control value sequence is "111", i.e., all the pixels 52, 54 and 56 are generated through the intra-field interpolation operations, the error correction unit 262 further checks if a first included angle that defined an edge direction of the pixel 52 and the edge direction of the pixel 54 or a second included angle that defined the edge direction of the pixel 54 and an edge direction corresponding to the pixel 56 is less than the first threshold value. If any one of the first or second included angles is less than the first threshold value then the error correction unit 262 determines that the interpolation rule of the pixel 54 is valid, else the error correction unit 262 further checks if the edge directions of the pixels 52, 54 and 56 present a gradual change. For example, suppose that an included angle A1 is defined by the edge direction of the pixel 52 and a specific direction (such as the vertical direction or the horizontal direction); an included angle A2 is defined by the edge direction of the pixel 54 and the specific direction; and an included angle A3 is defined by the edge direction of the pixel 56 and the specific direction. The error correction unit 262 can determine if the interpolation rule of the pixel 54 is valid by checking whether or not the three included angles A1, A2 and A3 present a monotonic increasing (i.e., $A1 \leq A2 \leq A3$) or a monotonic decreasing (i.e., $A1 \geq A2 \geq A3$). If so, the error correction unit 262 determines that the interpolation rule of the pixel 54 is valid, else the interpolation rule is determined as invalid. In practice, the foregoing included angles can be expressed utilizing corresponding representative values.

Once the interpolation rule of the pixel 54 is determined as invalid, the error correction unit 262 of this embodiment adjusts the pixel value of the pixel 54 according to at least one pixel value of nearby pixels of the pixel 54. For example, the error correction unit 262 can replace the pixel value of the pixel 54 with the pixel values of the pixels 52, the pixel value of the pixel 56 or an average of the two pixel values.

If the control value sequence is "010", the error correction unit 262 of this embodiment simply determines that the interpolation rule of the pixel 54 is invalid and accordingly controls the interpolating circuit 250 to change the interpolation rule of the pixel 54 to be the inter-field interpolation operation instead of the intra-field interpolation operation.

In the foregoing embodiments, the error correction unit 262 determines if the interpolation rule of the pixel 54 is valid in accordance with the interpolation rules of the pixels 52, 54 and 56. In another embodiment, the error correction unit 262 determines if the interpolation rule of the pixel 54 is valid by comparing the pixel value of the pixel 54 with a plurality of nearby pixels. For example, the error correction unit 262 can simply determine that the interpolation rule of the pixel 54 is invalid when the pixel value of the pixel 54 is greater than or less than all the pixel values of the nearby pixels.

[Smoothing Operation]

The smoothing unit 264 is arranged for smoothing the output frame 150 and functions as a low-pass filter. The smoothing unit 264 determines if the pixel value of the pixel 54 is valid by checking whether or not a plurality of interpolation rules corresponding to the pixels 52, 54 and 56 satisfy a predetermined condition. The smoothing unit 264 does not adjust the pixel value of the pixel 54 when it is determined as valid. On the contrary, the pixel value of the pixel 54 requires adjustment only when it is determined to be invalid. In this embodiment, when the control value sequence of the pixels 52, 54 and 56 is "101", the smoothing unit 264 determines that the pixel value of the pixel 54 is valid. When the control value sequence is "010", the smoothing unit 264 checks if an included angle defined by the edge direction corresponding to the pixel 54 and the vertical direction is less than a predetermined angle. If so, the smoothing unit 264 also determines that the pixel value of the pixel 54 is valid, else the smoothing unit 264 adjusts the pixel value of the pixel 54.

When the control value sequence is "011" or "110", the smoothing unit 264 checks if the edge direction corresponding to the pixel 54 is a predetermined direction such as the vertical direction. If so, the pixel value of the pixel 54 is not adjusted, else the smoothing unit 264 further checks if an included angle defined by two edge directions respectively corresponding to two pixels that are generated through the intra-field interpolation operations is less than a second threshold value. If so, the smoothing unit 264 determines that the pixel value of the pixel 54 is valid, else determines that the pixel value is invalid.

In addition, when the control value sequence is "111", i.e., the pixels 52, 54 and 56 are generated through the intra-field interpolation operations, the smoothing unit 264 determines if a first included angle defined by the edge direction of the pixel 52 and the edge direction of the pixel 54 or a second included angle defined by the edge direction of the pixel 54 and the edge direction of the pixel 56 is less than the second threshold value. If so, the smoothing unit 264 determines that the pixel value of the pixel 54 is valid, else it determines that the pixel value is invalid and accordingly adjusts the pixel value of the pixel 54.

Specifically, the smoothing unit 264 computes a new pixel value for the pixel 54 according to at least one pixel value of the nearby pixels. For example, the smoothing unit 264 can replace the pixel value of the pixel 54 with the pixel values of the pixels 52, the pixel value of the pixel 56 or an average of the two pixel values.

[Edge Enhancement Operation]

The edge enhancement unit 266 is utilized for determining if the pixel 54 is located on an edge direction according to the plurality of interpolation rules mentioned above. For example, when the pixel 54 and a single adjacent pixel (i.e., either the pixel 52 or the pixel 56) are generated through the intra-field interpolation operations, or the control value sequence is "011" or "110", it means the pixel 54 is located on an edge direction. In this situation, the edge enhancement unit 266 further determines if the difference between the edge direction of the pixel 54 and the edge direction of the adjacent pixel that generated through the intra-field interpolation operation is less than a third threshold value. If so, the edge enhancement unit 266 increases the pixel difference between the pixel 54 and at least one nearby pixel. For example, when the control value sequence is "011", the edge enhancement unit 266 determines if the difference between the edge direction of the pixel 54 and the edge direction of the pixel 56 is less than the third threshold value. If the difference is less than the third threshold value, it means that the pixel 54 is located on an edge direction of the output frame 150. For example, suppose that both the edge directions of the pixels 54 and 56 are the vertical direction, it is obvious that edge direction in which the pixel 54 located at is the vertical direction. In such a scheme, the edge enhancement unit 266 may calculate the following computation:

$$P\_54' = \{[(-1)*P\_52 + (2)*P\_54 + (-1)*P\_56] + P\_54\}/2 \qquad (1)$$

where P__52 is the pixel value of the pixel 52, P__54 is the ordinary pixel value of the pixel 54, P__56 is the pixel value of the pixel 56, and P__54' is the new pixel value for the pixel 54.

By utilizing the computation (1), the pixel difference between the pixel 54 and each of the pixels located on both sides of the vertical direction (e.g., the pixels 52 and 56) is increased by the edge enhancement unit 266.

The computation (1) is merely an embodiment and not a restriction of the present invention. The edge enhancement unit 266 can employ other computations to increase the pixel difference between the pixel 54 and each of the pixels located on both sides of the edge direction. In practice, the edge enhancement unit 266 can perform the edge enhancement operation for all pixels of the output frame 150.

In practical implementations, the error correction unit 262, the smoothing unit 264 and the edge enhancement unit 266 within the post processing circuit 260 can be arranged in any order. Additionally, the post processing circuit 260 may comprise only one or two of the three components 262, 264 and 266 depending on the design requirement.

As in the foregoing descriptions, the deinterlacing device 200 is able to further process the interpolated pixels based the information obtained during the deinterlacing operations. This information includes: the control values generated from the decision unit 240 and the edge directions employed by the interpolating circuit 250.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method comprising:
    deinterlacing video data to generate pixel values for first, second, and third pixels;
    recording a plurality of interpolation rules corresponding to the first, second, and third pixels; and
    determining whether to adjust the pixel value of the second pixel according to at least one of the plurality of interpolation rules;
    wherein each of the interpolation rules indicates an intra-field interpolation operation or an inter-field interpolation operation.

2. The method of claim 1, wherein the first, second and third pixels are adjacent.

3. The method of claim 1, wherein the step of recording the plurality of interpolation rules further comprises:
    when one of the first, second and third pixels is generated through the intra-field interpolation operation, recording an edge direction corresponding to the pixel generated by the intra-field interpolation operation.

4. The method of claim 1, wherein the step of determining whether to adjust the pixel value of the second pixel further comprises:
    performing an error correction operation that comprises:
        determining if the interpolation rule of the second pixel is valid according to at least one of the plurality of interpolation rules; and
        if the interpolation rule of the second pixel is invalid, adjusting the pixel value of the second pixel according to at least one pixel value of nearby pixels of the second pixel.

5. The method of claim 4, wherein the error correction operation further comprises:
    determining if the interpolation rule of the second pixel is valid according to at least one edge direction of the first, second and third pixels.

6. The method of claim 1, wherein the step of determining whether to adjust the pixel value of the second pixel further comprises:
    performing an error correction operation that comprises:
        comparing the pixel value of the second pixel with pixel values of a plurality of nearby pixels of the second pixel; and
        if the pixel value of the second pixel is greater than or less than the pixel values of the plurality of nearby pixels, adjusting the pixel value of the second pixel according to at least one pixel value of the nearby pixels.

7. The method of claim 1, wherein the step of determining whether to adjust the pixel value of the second pixel further comprises:
    performing a smoothing operation that comprises:
        determining if the pixel value of the second pixel is valid according to at least one of the plurality of interpolation rules; and
        if the pixel value of the second pixel is invalid, adjusting the pixel value of the second pixel according to at least one pixel value of nearby pixels of the second pixel.

8. The method of claim 7, wherein the smoothing operation further comprises:
    determining if the pixel value of the second pixel is valid according to at least one edge direction of the first, second and third pixels.

9. The method of claim 1, wherein the step of determining whether to adjust the pixel value of the second pixel further comprises:
    performing an edge enhancement operation that comprises:
        determining if the second pixel is located on an edge direction; and
        if the second pixel is located on the edge direction, increasing the pixel difference between the second pixel and a nearby pixel.

10. An image processing device for deinterlacing video data, comprises a plurality of adjacent fields, to generate a pixel value for a second pixel, the image processing device comprising:
    a detection module for determining the degree of difference among the plurality of fields with respect to the pixel position of the second pixel;
    a decision unit coupled to the detection module for generating an interpolation rule according to the degree of difference;
    an interpolating circuit coupled to the decision unit for generating the pixel value of the second pixel according to the interpolation rule and the video data; and
    a post processing circuit coupled to the decision unit and the interpolating circuit for determining whether to adjust the pixel value of the second pixel according to at least one of a plurality of interpolation rules corresponding to the second pixel, a first, and a third pixel;
    wherein each of the interpolation rules indicates an intra-field interpolation operation or an inter-field interpolation operation.

11. The image processing device of claim 10, further comprising:
    a storage medium coupled to the detection module and the interpolating circuit for storing required video data for the deinterlacing operation.

12. The image processing device of claim 10, wherein the post processing circuit comprises an error correction unit for determining if the interpolation rule of the second pixel is valid according to at least one of the plurality of interpolation rules, and if the interpolation rule of the second pixel is determined as invalid, the error correction unit adjusts the pixel value of the second pixel according to at least one pixel value of nearby pixels of the second pixel.

13. The image processing device of claim 12, wherein the error correction unit further evaluates at least one edge direction of the first, second and third pixels to determine if the interpolation rule of the second pixel is valid.

14. The image processing device of claim 10, wherein the post processing circuit comprises an error correction unit for comparing the pixel value of the second pixel with pixel values of a plurality of nearby pixels of the second pixel, and if the pixel value of the second pixel is greater than or less than the pixel values of the plurality of nearby pixels, the error correction unit adjusts the pixel value of the second pixel according to at least one pixel value of the nearby pixels.

15. The image processing device of claim 10, wherein the post processing circuit comprises a smoothing unit for determining if the pixel value of the second pixel is valid according to at least one of the plurality of interpolation rules, and if the pixel value of the second pixel is invalid, the smoothing unit adjusts the pixel value of the second pixel according to at least one pixel value of nearby pixels of the second pixel.

16. The image processing device of claim 15, wherein the smoothing unit further evaluates at least one edge direction of the first, second and third pixels to determine if the pixel value of the second pixel is valid.

17. The image processing device of claim 10, wherein the post processing circuit comprises an edge enhancement unit for determining if the second pixel is located on an edge direction, and if the second pixel is located on the edge direction, the edge enhancement unit increases the pixel difference between the second pixel and a nearby pixel.

18. The image processing device of claim 17, wherein the edge enhancement unit further evaluates an edge direction corresponding to the first, second or third pixel to determining if the second pixel is located on an edge direction.

19. An image processing method for processing pixels produced by a de-interlacing operation, the image processing method comprising:
    recording a plurality of interpolation rules corresponding to first, second and third pixels produced by the de-interlacing operation; and
    adjusting a pixel value of the second pixel according to at least one of the plurality of interpolation rules;
    wherein the interpolation rule of each pixel indicates that each pixel was generated through an intra-field interpolation operation or an inter-field interpolation operation.

20. The method of claim 19, wherein the step of adjusting the pixel value of the second pixel further comprises:
    generating a new pixel value according to at least one pixel value of nearby pixels of the second pixel; and
    replacing the pixel value of the second pixel with the new pixel value.

21. The method of claim 19, wherein the step of adjusting the pixel value of the second pixel further comprises:
    increasing pixel difference between the second pixel and at least one nearby pixel.

22. The method of claim 19, wherein the step of adjusting the pixel value of the second pixel further comprises performing at least one of an error correction operation, a smoothing operation, and an edge enhancement operation;
    wherein the error correction operation comprises:
        determining if the interpolation rule of the second pixel is valid according to at least one of the plurality of interpolation rules; and
        if the interpolation rule of the second pixel is invalid, adjusting the pixel value of the second pixel according to at least one pixel value of nearby pixels of the second pixel;
    the smoothing operation comprises:
        determining if the pixel value of the second pixel is valid according to at least one of the plurality of interpolation rules; and
        if the pixel value of the second pixel is invalid, adjusting the pixel value of the second pixel according to at least one pixel value of the nearby pixels; and
    the edge enhancement operation comprises:
        determining if the second pixel is located on an edge direction according to the interpolation rules of the second pixel and an adjacent pixel, which is the first pixel or the third pixel; and
        if the second pixel is located on the edge direction, increasing the pixel difference between the second pixel and a nearby pixel.

23. The method of claim 19, further comprising:
comparing the pixel value of the second pixel with pixel values of a plurality of nearby pixels of the second pixel; and
if the pixel value of the second pixel is greater than or less than the pixel values of the plurality of nearby pixels, adjusting the pixel value of the second pixel according to at least one pixel value of the nearby pixels.

* * * * *